United States Patent
Qama

(10) Patent No.: US 11,112,274 B2
(45) Date of Patent: Sep. 7, 2021

(54) FULLY REDUNDANT POSITION SENSOR

(71) Applicant: Integrated Device Technology, Inc., San Jose, CA (US)

(72) Inventor: Gentjan Qama, Munich (DE)

(73) Assignee: Integrated Device Technology, Inc., San Jose, CA (US)

( * ) Notice: Subject to any disclaimer, the term of this patent is extended or adjusted under 35 U.S.C. 154(b) by 45 days.

(21) Appl. No.: 16/528,115

(22) Filed: Jul. 31, 2019

(65) Prior Publication Data
US 2020/0072643 A1 Mar. 5, 2020

Related U.S. Application Data

(60) Provisional application No. 62/725,185, filed on Aug. 30, 2018.

(51) Int. Cl.
*G01D 5/20* (2006.01)

(52) U.S. Cl.
CPC ................ *G01D 5/2053* (2013.01)

(58) Field of Classification Search
None
See application file for complete search history.

(56) References Cited

U.S. PATENT DOCUMENTS

| | | | |
|---|---|---|---|
| 6,236,199 B1 | 5/2001 | Irie | |
| 2005/0030012 A1* | 2/2005 | Kunz-Vizenetz | G01D 5/145 324/207.25 |
| 2005/0264284 A1* | 12/2005 | Wang | G01N 27/904 324/240 |
| 2012/0274185 A1 | 11/2012 | Kanemitsu et al. | |
| 2015/0145510 A1* | 5/2015 | Goldfine | G01N 27/9033 324/240 |
| 2016/0006323 A1* | 1/2016 | Hourne | G01D 5/2073 324/207.16 |
| 2019/0025088 A1* | 1/2019 | Utermoehlen | G01D 5/2073 |

FOREIGN PATENT DOCUMENTS

| | | |
|---|---|---|
| CN | 206146372 U | 5/2017 |
| EP | 0945381 A2 | 9/1999 |
| EP | 1925533 A1 | 5/2008 |

(Continued)

OTHER PUBLICATIONS

European Communication with European Search Report for European Application No. 19193896.8, dated Jan. 9, 2020, pp. 1-7.

(Continued)

*Primary Examiner* — Jas A Sanghera
(74) *Attorney, Agent, or Firm* — Haynes and Boone, LLP

(57) ABSTRACT

A position sensor according to some embodiments includes a first position sensor board having first sensor coils and a first transmit coil; a second position sensor board having second sensor coils stacked with, and separated from by a distance Z, the first position sensor; and at least one target positioned relative to the stacked first position sensor and second position sensor. A redundant position sensor according to some embodiments includes a plurality of stacked sensor boards, each of the plurality of sensor boards including sensor coils, wherein one of the plurality of stacked sensor boards includes an active transmit coil; and a target positioned over the plurality of stacked sensor boards.

15 Claims, 16 Drawing Sheets

(56) References Cited

FOREIGN PATENT DOCUMENTS

| JP | 2000018968 A | 1/2000 |
|---|---|---|
| JP | 2012231648 A | 11/2012 |
| JP | 2014190711 A | 10/2014 |
| JP | 2018501489 A | 1/2018 |
| WO | 2016157900 A1 | 10/2016 |
| WO | 2017144638 A1 | 8/2017 |

OTHER PUBLICATIONS

Office Action from the Japanese Patent Office for Japanese Application No. 2019-156356, dated Sep. 23, 2020, 12 pages.

\* cited by examiner

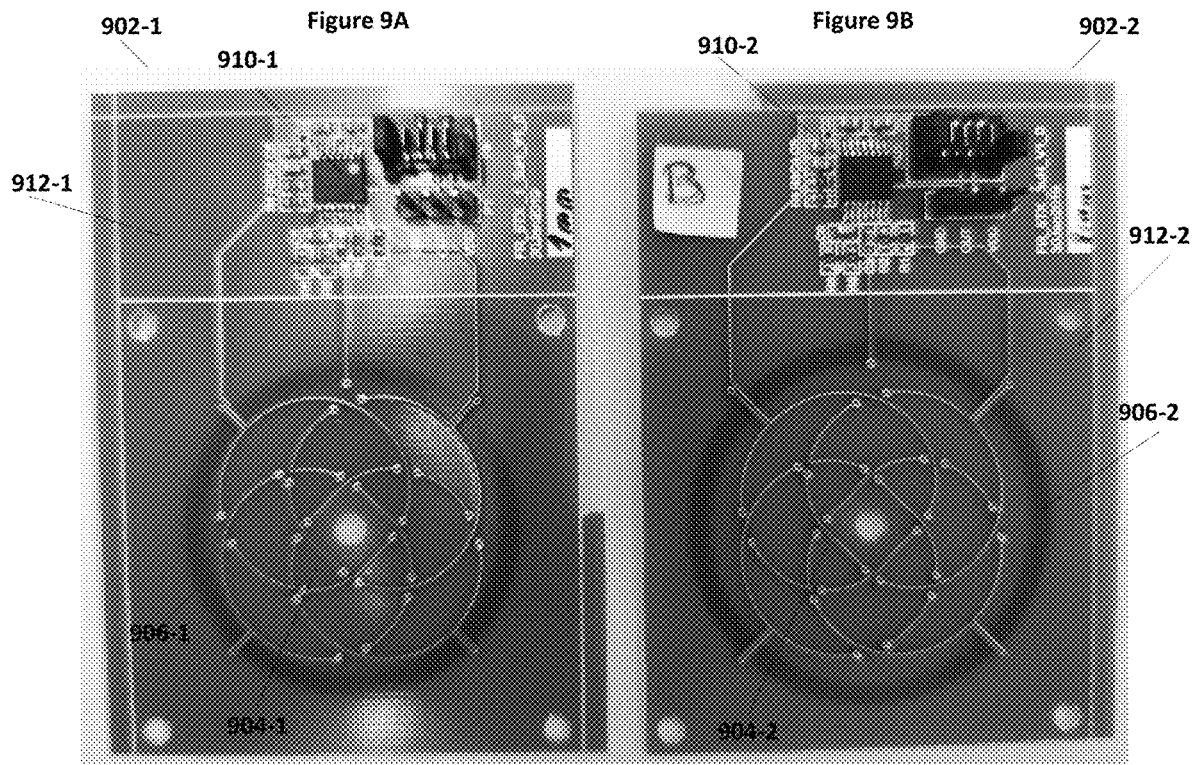
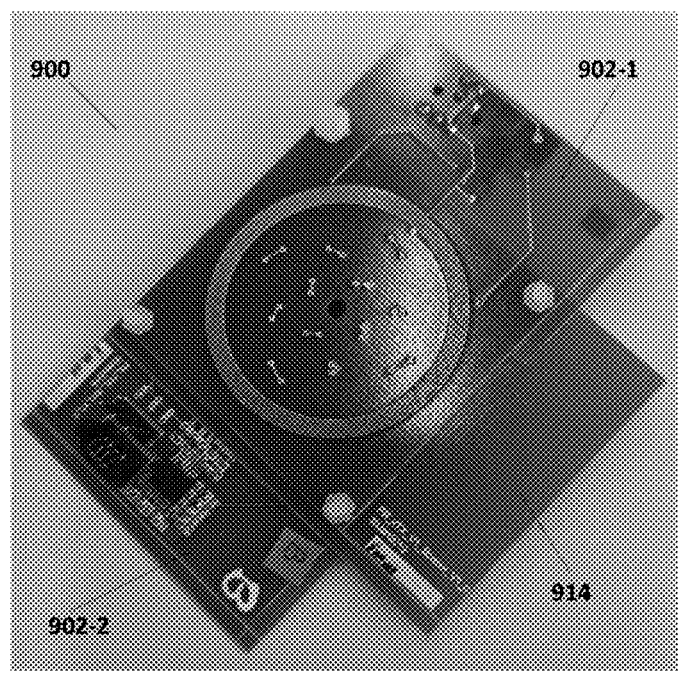

FULLY REDUNDANT POSITION SENSOR

RELATED APPLICATION

The present application claims priority to Provisional Patent Application Ser. No. 62/725,185, entitled "Fully Redundant Position Sensor," by Gentjan Qama and Maria Agalidis, filed on Aug. 30, 2018, which is herein incorporated by reference in its entirety.

TECHNICAL FIELD

Embodiments of the present invention are related to position sensors and, in particular, to redundant position sensors.

DISCUSSION OF RELATED ART

Position sensors are used in various settings for measuring the position of one component with respect to another. Inductive position sensors can be used in automotive, industrial and consumer applications for absolute rotary and linear motion sensing. In many inductive positioning sensing systems, a transmit coil is used to induce eddy currents in a metallic target that is sliding or rotating above a set of receiver coils. Receiver coils receive the magnetic field generated from eddy currents and the transmit coils and provide signals to a processor. The processor uses the signals from the receiver coils to determine the position of the metallic target above the set of coils. The processor, transmitter, and receiver coils may all be formed on a printed circuit board (PCB).

However, these systems exhibit inaccuracies for many reasons. For example, the electromagnetic field generated by the transmitter, and the resulting fields generated in the metallic target, may be non-uniform, the connections of wire traces to the transmit coils and the arrangement of receive coils may result in further non-uniformity. The air-gap (AG) between the metallic target and the coils mounted on the PCB may be non-uniform. Further, the amplitudes of signals generated by receiver coils may have an offset. There may be mismatches between the multiple receiver coils. There may be different coupling effects between the metallic target and each of the multiple receiver coils. These and other factors may result in inaccurate results of the position locating system.

Therefore, there is a need to develop better methods of designing sensor coils that offer better accuracy for position sensing.

SUMMARY

In some embodiments, a position sensor design is provided. A position sensor according to some embodiments includes a first position sensor board having first sensor coils and a first transmit coil; a second position sensor board having second sensor coils stacked with, and separated from by a distance Z, the first position sensor; and at least one target positioned relative to the stacked first position sensor and second position sensor.

A redundant position sensor according to some embodiments includes a plurality of stacked sensor boards, each of the plurality of sensor boards including sensor coils, wherein one of the plurality of stacked sensor boards includes an active transmit coil; and a target positioned over the plurality of stacked sensor boards.

These and other embodiments are discussed below with respect to the following figures.

BRIEF DESCRIPTION OF THE FIGURES

FIGS. 9A, 9B, 9C, and 9D illustrate another example of a stacked position sensor according to some embodiments.

These and other aspects of embodiments of the present invention are further discussed below.

DETAILED DESCRIPTION

In the following description, specific details are set forth describing some embodiments of the present invention. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure.

This description illustrates inventive aspects and embodiments should not be taken as limiting—the claims define the protected invention. Various changes may be made without departing from the spirit and scope of this description and the claims. In some instances, well-known structures and techniques have not been shown or described in detail in order not to obscure the invention.

Embodiments of the present invention utilize stacked sensor boards to provide redundant measurements of the position of a target positioned over the stacked sensor boards. Each of the boards includes sensor coils, usually a sin coil and a cos coil. At least one of the boards has an active transmit coils. One transmit coil on one of the stacked boards is powered while the remaining transmit coils are shorted so as to be inoperative or, in some embodiments, do not exist. The measurement of signals from multiple stacked sets of sensor coils on the stacked sensor boards can then be used to provide redundant signals from which a more accurate measure of the position of a target positioned over the stacked boards can be made.

In a redundant sensor, for example one used in automotive application, the system sensors should remain working when one or more of the transmitters is shorted for any reason, as is the case in embodiments of the present invention. The issue that occurs when a transmitter is shorted is a result of coupling between the transmitters. When one transmitter is shorted the magnitude is damped down, for example to 70% of its full value. Embodiments of the present invention provides solutions for handling or controlling the damping of the magnitude as a result of these interactions between transmit coils.

Figure 1:
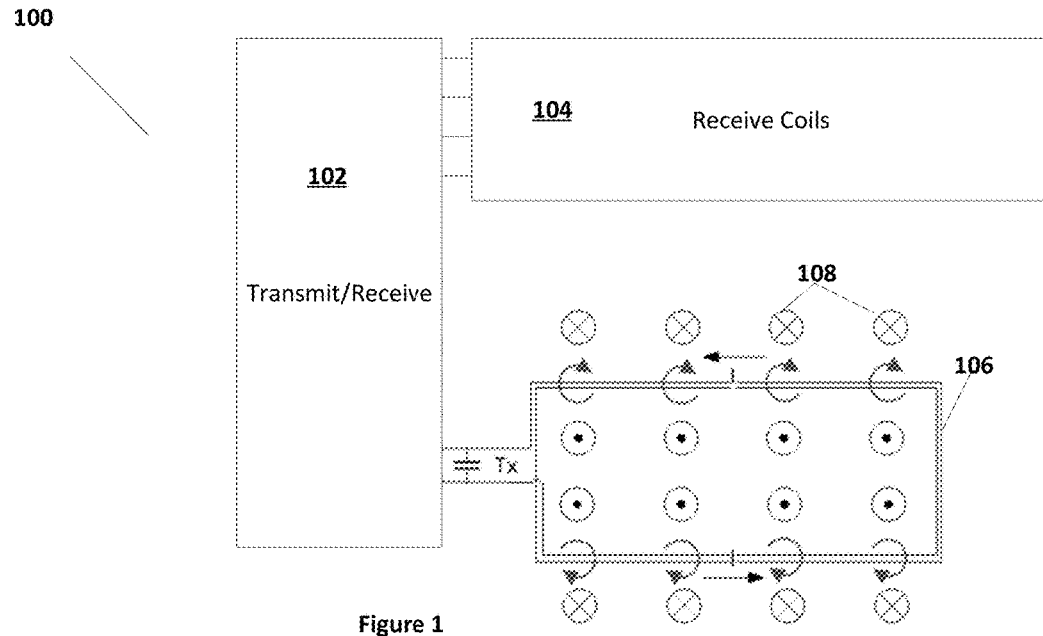
FIG. 1 illustrates a coil system for determining a position of a target.

FIG. 1 illustrates a positioning system 100. As illustrated in FIG. 1, the positioning system includes a transmit/receive control circuit 102 that is coupled to drive a transmitter coil 106 and receive signals from receive coils 104. In most configurations, receive coils 104 are formed on a printed circuit board (PCB) within transmitter coil 106, which is also formed on the PCB. In FIG. 1, for purposes of clarity, transmit coil 106 and receive coils 104 are illustrated separately. Receive coils 104 are generally physically located within a border formed by transmit coil 106. As is illustrated in FIG. 1, transmit coils 106 are driven to generate a magnetic field 108. Magnetic field 108, with the positive current illustrated by the arrows, is circular around each wire and in a direction that points out of the page inside coil 106 and into the page outside of coil 108 with the current direction as illustrated in FIG. 1. In general, transmit coil 106 is driven to provide a time-varying magnetic field 108. The time-varying magnetic field 108 interacts with a conductive target (not shown), which then induces a response in receive coils 104. The position of conductive target over receive coils 104 can be determined by the response induced in receive coils 104.

Figure 2A:
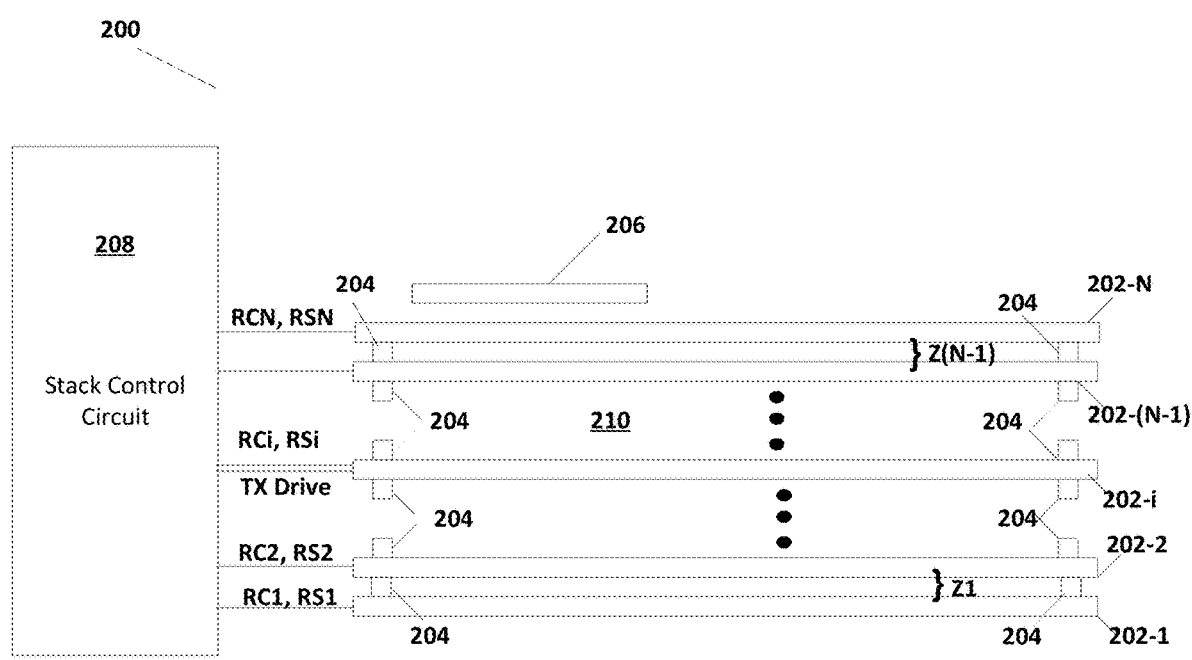
FIGS. 2A and 2B illustrate a position sensor according to some embodiments of the present invention.

FIG. 2A illustrates a positioning system 200 according to some embodiments of the present invention. As illustrated in FIG. 2A, positioning system 200 includes a sensor board stack 210. Sensor board stack 210 includes N sensor boards 202 (sensor boards 202-1 through 202-N). Each of sensor boards 202 includes sensor coils, usually a sin coil and a cos coil. Further, each of sensor boards 202 may include a transmit coil, although in some embodiments only one sensor board 202, sensor board 202-$i$ illustrated in FIG. 2A, may have a transmit coil. In embodiments where all of sensor boards 202 include a transmit coil, the transmit coil on all of sensor boards 202 except for sensor board 202-$i$ are shorted and therefore become ineffective. In embodiments of the present invention, N is any integer that is two (2) or greater (N≥2) while i identifies whichever one of boards 202-1 through 202-N has an active transmit coil (1≤i≤N).

As is illustrated in FIG. 2A, in some embodiments spacers 204 can provide spacing between adjacent ones of sensor boards 202. In some embodiments, sensor coils may be arranged on opposite sides of a multi-layer PCB board such that the spacing between sensor coils 204 corresponds to the board thickness. In such case, spacers 204 may not be included and boards 202 may be bonded to each other. As illustrated in FIG. 2A, the spacing between boards 202-1 and 202-2 can be Z1, for example. The spacing between boards 202-(N−1) and 202-N is Z(N−1). In some embodiments, the spacing between adjacent boards can be different so that spacings Z1 through Z(N−1) may all be different. However, in some embodiments, the spacings may all be the same and designated as spacing Z.

As is further illustrated in FIG. 2A, target 206 is positioned to move over the top sensor board 202 in stack 210. Transmit coils on one of boards 202-1 through 202-N in stack 210 are energized. As illustrated in FIG. 2A, the transmit coils in board 202-$i$ is energized while any transmit coils in the remainder of boards 202 is rendered ineffective, usually by shorting the ineffective transmit coils. As further discussed below, sensor coils on each of boards 202 in stack 210 provide signals indicative of the position of target 206 over each of boards 202-1 through 202-N.

As is further illustrated in FIG. 2A, a stack control circuit 208 is coupled to each of boards 202 in stack 210. As is illustrated in FIG. 2A, stack control circuit 208 is coupled to sensor coils on each of boards 202-1 through 202-N and is coupled to control the drive of the transmit coil on board 202-$i$. In some embodiments, stack control circuit 208 may be coupled directly to coils on each of boards 202-1 through 202-N. In some embodiments, stack control circuit 208 may be coupled to circuits on each of boards 202-1 through 202-N that are then coupled to coils on those boards. Stack control circuit 208, therefore, controls the drive of the transmit coil on board 202-$i$ and receives sensor signals, usually a sin coil signal (RS) and a cos coil signal (RC), from each of boards 202-1 through 202-N. From the signals from the sensor coils, stack control circuit 208 determines the position of target 206 relative to boards 202-1 through 202-N of stack 210.

Figure 2B:
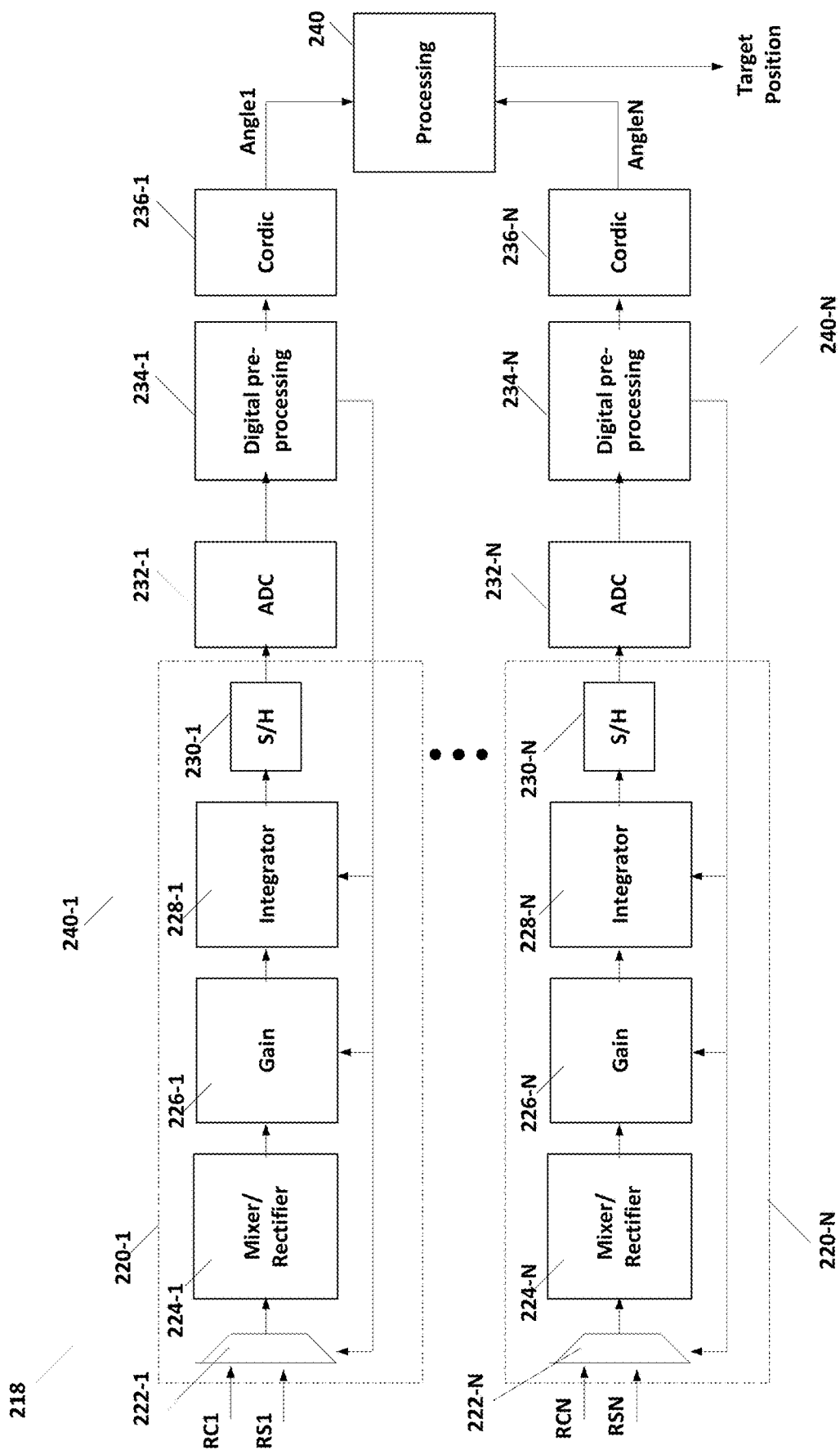

FIG. 2B illustrates an example embodiment of a processing circuit 218, which can include stack control circuit 208 and other circuitry that may be present on individual boards 202-1 through 202-N. Consequently, in some embodiments, some functions illustrated in processing circuit 218 illustrated in FIG. 2B can be performed on circuitry on individual ones of boards 202-1 through 202-N.

As illustrated in FIG. 2B, processing circuit 218 includes individual circuits 240-1 through 240-N, each of which processes the receive signals RC1, RS1 through RCN, RSN from each of boards 202-1 through 202-N, respectively. The signals RC1, RS1 through RCN, RSN refers to the cosine configured receive coil signals (RCj) and the sine configured receiver coil signals (RSj) from board 202-$j$, where 1≤j≤N.

Considering circuit 240-1 specifically as an example, receiver signals RC1 and RS1 are received in an analog front end (AFE) 220-1. Signals RC1 and RS1 may be received in a multiplexer 222-1 in AFE 220-1, which may time-division multiplex the input signals. In some embodiments, each of receiver signals RC1 and RS1 can be processed by parallel circuits in processing circuit 240-1.

As shown in FIG. 2B, the output signal from multiplexer 222-1 is input to a rectifier 224-1, which rectifies the signals RC1 and RS1 to provide rectified signals. The rectified signals are then input to gain stage circuit 226-1. Gain stage circuit 226-1 can provide controlled amplification of the rectified signals. Each gain stage in gain circuit 226-1 can increase the magnitude so that the rectified signal is increased by a factor $(\sqrt{2})^{GS}$, where GS is the number of gain stages. Any number of gain stages GS can be used. In some embodiments, the number of gain stages GS can be controlled by a digital processing circuit 234-1, which is further discussed below.

The amplified signal from gain stage circuit 226-1 is then input to integrator 228-1. Integrator circuit 228-1 integrates the signals from gain stage 226-1 over an effective integration time given by (7+ext)*lc_period, where lc_period=1/LC. The period 1/LC represents the tank frequency of the receive coil inductance and a tank capacitor. When, as described above, the frequency is increased during a short of the transmit coils, the lc_period also decreases, which also decreases the effective integration time. The gain of integrator 228-1 is then proportional to the effective integration time. The parameter ext is a controllable extension parameter, which again can be set in digital pre-processing 234-1 as discussed below.

In some embodiments, gain stages 226-1 and integrator 228-1 may be interchanged from that shown in FIG. 2B. In those embodiments, the signals from rectifier 224-1 are first integrated in integrator 228-1 and then amplified in gain stages 226-1.

The output signals from integrator 228-1 is then input to a sample-and-hold circuit 230-1. An Analog-to-Digital Converter (ADC) 232-1 then receives and digitizes the held signals from sample-and-hold circuit 2301. The digitized signals from ADC 232-1 are input to a digital processing circuit 234-1, which may provide further digital processing. Further filtering may be performed in digital processing circuit 234-1. Furthermore, digital processing circuit 234-1 provides signals (e.g., GS and ext) that control gain stage circuit 226-1, integrator 228-1, and multiplexer 222-1. These parameters can be determined in digital processing circuit 234-1 by monitoring the processed and digitized signals RC1 and RS1 received from the receiver coils and adjusting gains and integration times accordingly. The signal from processing 234-1 can then be provided to a Coordinate Rotation by Digital Computer (CORDIC) 236-1. CORDIC 236-1 receives the processed signals RC1 and RS1 and provides the angle signal Angle1. In some embodiments, the functions of digital processing circuit 234-1 and CORDIC 236-1 can be performed on a microcontroller that includes digital processors and memory (volatile and non-volatile) that holds data and programming instructions to be executed on the digital processors.

As is further illustrated in FIG. 2B, each of circuits 240-1 through 240-N include the same components. Multiplexer 222-N, rectifier 224-N, gain stages 226-N, integrator 228-N, and sample-and-hold 230-N of AFE 220-N operate as described above with respect to the multiplexer 222-1, rectifier 224-1, gain stages 226-1, integrator 228-1, and sample-and-hold 23-N of AFE 220-1 described above. Similarly, ADC 232-N, digital pre-processing 234-N, and CORDIC 238-N operate as described above with respect to ADC 232-1, digital pre-processing 234-1, and CORDIC 238-1 as described above.

Processing 240 receives the angle determinations Angle1 through AngleN from circuits 240-1 through 240-N, respectively. Processing 240 then determines the positioning of target 206 based on the angles Angle1 through AngleN. Processing 240 can also be executed on a microcontroller, which may be the same microcontroller discussed above or a different microcontroller.

Figure 3:
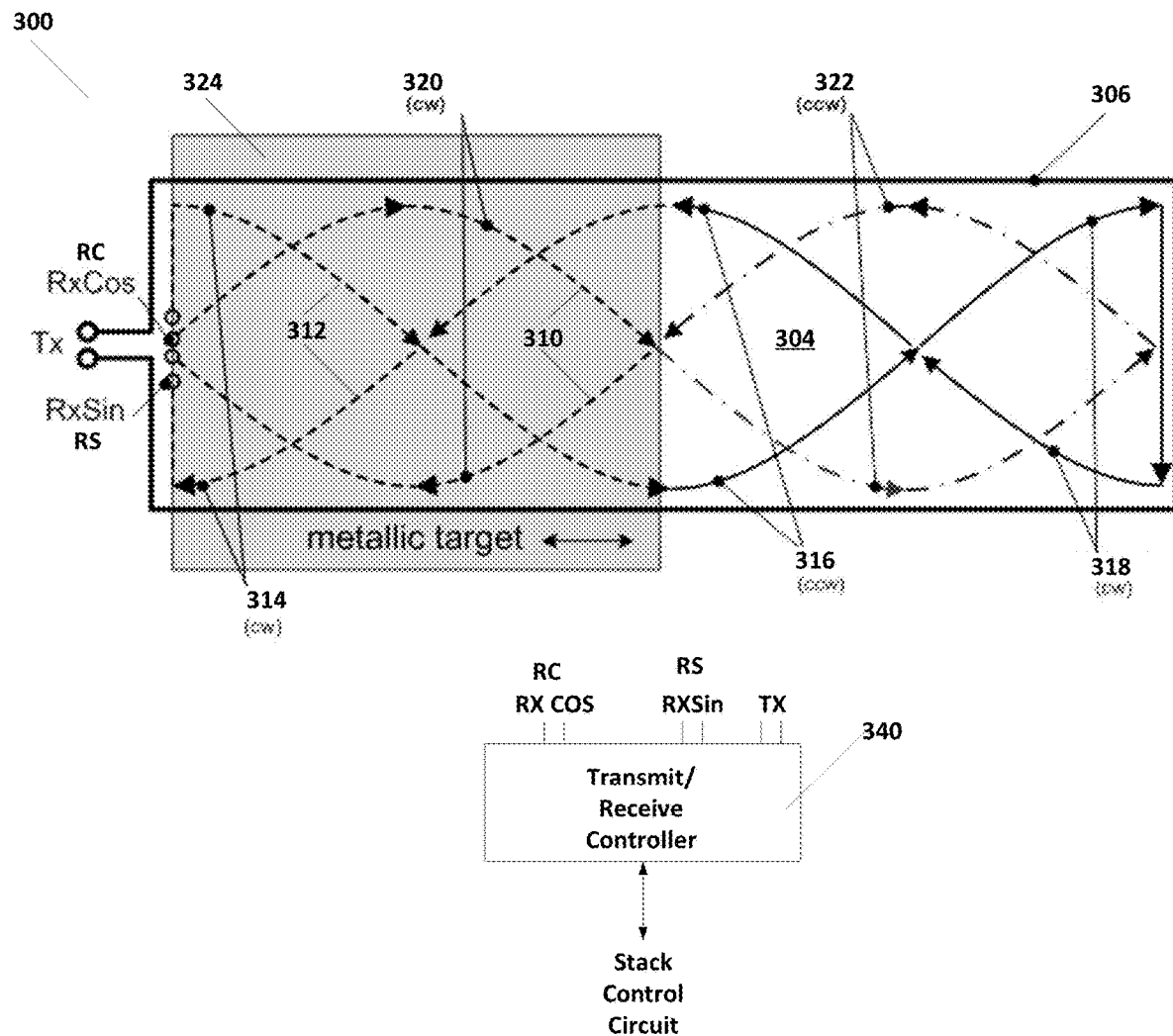
FIG. 3 illustrates a linear sensor board that can be used in the position sensor illustrated in FIG. 2A.

FIG. 3 illustrates a configuration of transmit coil 306 and receive coils 304 on a board 300, which in this example is a linear position locating board 300. For reference, a conductive metallic target 324 is illustrated positioned over board 300. In operation, transmit coil 306 can be driven to form a magnetic field if board 300 corresponds to board 202-i in stack 204, otherwise transmit coil 306 may be removed or shorted. Transmit coil 306 can be driven at a range of frequencies or at particular frequencies to create a time-varying magnetic field. Receive coils 304 are located inside coil 306. Transmit coil 306 is driven at any frequency that can produce electromagnetic fields that result, through a target 324, in induced voltages in receiver coils 304. In general, there can be any number of receiver coils 304, however, for ease of discussion, a system with two receiver coils, a sin coil and a cos coil, is discussed below.

FIG. 3 illustrates the arrangement of sensor receive coils (RX) 304 within transmit coil (TX) 306. As illustrated in FIG. 3, sensor receive coils 304 includes a sin-wave oriented coil RX SIN 312 and a cos-oriented signal coil RX COS 310. Sin-wave oriented coil RX SIN 112 includes sin loops 314, 316, and 318 where coil 312 is wound in in-phase or anti-phase directions, here depicted as clockwise or counter clockwise depictions, to result in the production of voltages in the loop of opposite sign as a result of the presence of the electro-magnetic field generated by transmit coil 306. As is illustrated, the wiring of sin-wave oriented coil 312 provides a clockwise rotation in loops 314 and 318 resulting in a nominally positive voltage and a counterclockwise rotation in loop 316 resulting in nominally negative voltages. Similarly, cos oriented coil 310 may include a first loop 320 with a clockwise orientation and a second loop 322 with a counterclockwise orientation FIG. 3 illustrates a possible electromotive force reference direction, as indicated by the arrows, that is consistent with the magnetic fields produced by transmitter coil 306 in the period when the magnetic field generated by transmit coil 306 is into the page on the inside of transmit coil 306 and out of the page outside of the area defined by transmit coil 306. This is opposite when the time varying magnetic field driven by a time varying current in transmit coil 306 is oriented otherwise.

In some embodiments of the present invention, board 300 can be used as one of boards 202-1 through 202-N of stack 210 as illustrated in FIG. 2, the transmitter coil (TX) 306 is stimulated by the circuit 340 as directed by stack control circuit 208 if board 300 is board 202-i. Otherwise, transmit coil 306 is shorted or absent. As discussed above, stack control circuit 208 may be an integrated circuit that directs a current to transmit coil 306 of board 202-i, which generates a variable Electromagnetic field (EMF). The EMF couples with the receiver coils (RX) 304. If a conductive metallic target 324 is placed on the top of the receiver coils 304 as illustrated in FIG. 3, an eddy current is generated in the metallic target 324. This eddy current generates a new electromagnetic field that is ideally equal and opposite of the generated EMF, canceling the field in receiver coils 304 directly under metallic target 324. The receiver coils (RX) 304 capture the variable EMF field generated by the transmit coils 306 and those induced by metallic target 324, resulting in sinusoidal voltages generated at the terminals of receiver coils 304. Signals related to those voltages (RC and RS), as illustrated in FIGS. 2A and 2B, are input to stack circuit 208.

As discussed above, stack control circuit 208 and circuit 340 together operate to drive a transmit coil and receive signals from each set of sensor coils 304. As such, circuit 208 includes sufficient processing to receive and analyze sensor signals from circuit 340. Amplification and digitization can be performed in an analog-front-end (AFE) circuit 220 that is located in circuit 340, may be performed in circuit 208, or may be split between the two circuits. In some embodiments, circuit 340 may include circuit 240 (one of circuit 240-1 through 240-N as shown in FIG. 2B) while circuit 208 may include processing 240 as illustrated in FIG. 2B. Consequently, circuit 208 receives the angle signals Angle1 through AngleN from CORDICs 236-1 through 236-N, which are included in circuits 340-1 through 340-N of boards 202-1 through 202-N, respectively.

In the absence of metallic target 324, there will be no voltage at the terminals of the RX coils 304—labeled Rx COS 310 (RC) and RX Sin 312 (RS) in FIG. 3. When metallic target 324 is placed in a specific position with respect to the RX coils 304, the resultant electromagnetic field on the area covered by the metallic target 324 is ideally zero and therefore the voltages at the terminals of the RX coils 304 will have different characteristic depending on the location of metallic target 324 relative to receiver coils 304. The RX coils 304 provide a sin voltage that is created at the terminals of one RX coil (Rx Sin 312) and a cos voltage that is created at the terminals of the other RX coil (Rx Cos 310) as metallic target 324 is swept across receiver coils 304. The position of the target 324 with respect to the RX coils 304 modulates the amplitude and the phase of the voltage at the terminals of the RX coils 304, RC and RS.

As illustrated in FIGS. 2A and 2B, an on-board circuit 340 as illustrated in FIG. 3 can receive signals from stack control circuit 208, drive transmit coil 306 (if it is driven on that board), and receive signals from sensor coils 304. As discussed above, transmitter coil 306, receive coils 304, and a circuit 340 can be mounted on a single printed circuit board. Further, the PCB can be positioned such that metallic target 324 is positioned above receive coils 304 and spaced from receive coils 304 by a particular spacing, usually referred to as the air gap (AG). The position of metallic target 324 relative to the PCB on which receive coils 304 and transmitter coil 306 is mounted can be determined by processing the signals generated by sin-oriented coil 312 and cos-oriented coil 310.

As shown in FIG. 2A with N=2, in accordance with some embodiments of the present invention, a position sensor 200 can be formed by stacking two identical position sensor boards and shorting the transmitter coil of one of the stacked position sensor boards. As described above, a position sensor is formed with a transmission coil and, usually, two sensor coils. Stacking two positions sensors, while shorting the transmitter coil of one of them, provides redundancy in the position sensor coils that can result in more accurate measurement of the position of a target 206.

In some embodiments, four-layer board designs can be provided. In a four-layer board design, two sensor boards 202 (each with two layers) are stacked so that the distance between sensor coils 204 is given by the thickness of the printed circuit board layers. General observations have been formed from data taken using these board designs. These observations are 1) that the operating frequency is doubled when the Tx coil is shorted; 2) that the remaining active device whose coil is not shorted is functional, but the carrier frequency of the oscillation has doubled; 3) that having a doubled frequency means the signal magnitude is divided by two (2) due to the analog-front-end (AFE) integration in integrator 228-1; 4) that in order to compensate the magnitude loss due to frequency change, the integration cycle needs to be increased; and 5) that the gain stage (GS) of the processing circuitry needs to increase by two (2) additional stages to have the remaining active device function properly.

Figure 4A:
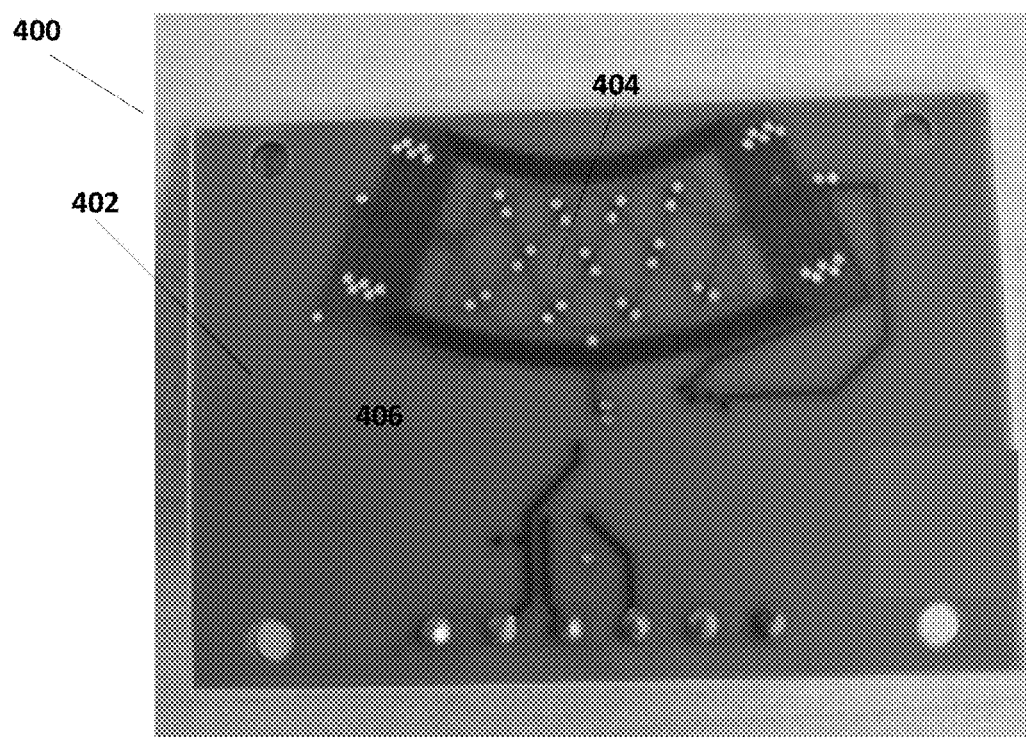
FIGS. 4A and 4B illustrate an angular position sensor board that can be used in the position sensor illustrated in FIG. 2A.
Figure 4B:
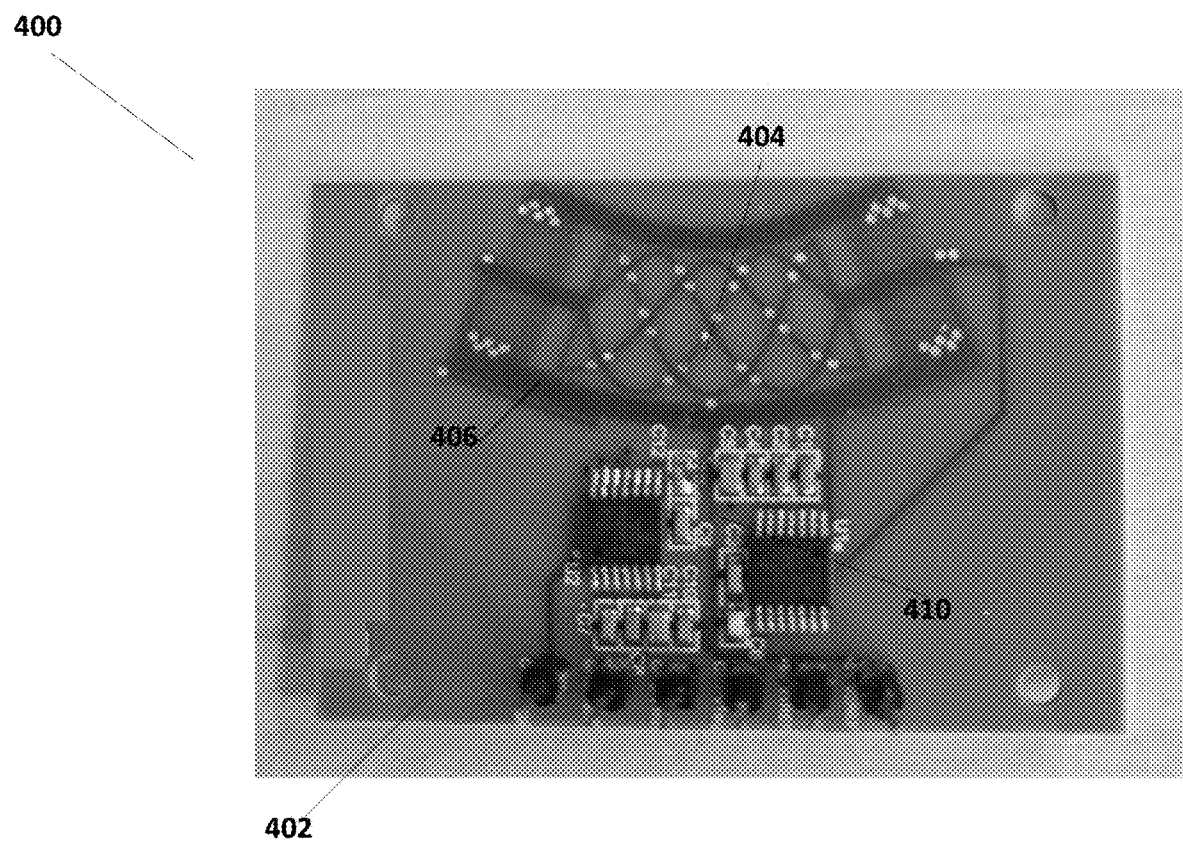

The stacked sensor boards 202 can be linear position sensor boards 300 as illustrated in FIG. 3. FIGS. 4A and 4B illustrate an angular position board 400 that can be used as stacked boards 202. FIG. 4A illustrates the back side of a position sensor board 400 and FIG. 4B illustrates the front side of a position sensor board 400. As illustrated in FIGS. 4A and 4B, transmit coil 406 and sensor coils 404 are positioned in an arc. Circuit 410, which interfaces with stack controller 208, can be mounted along with coils 404 and 406 on printed circuit board 402. As discussed above, circuit 410 may be configured as a circuit 240 (one of circuits 240-1 through 240-N) as illustrated in FIG. 2B.

Figure 5A:
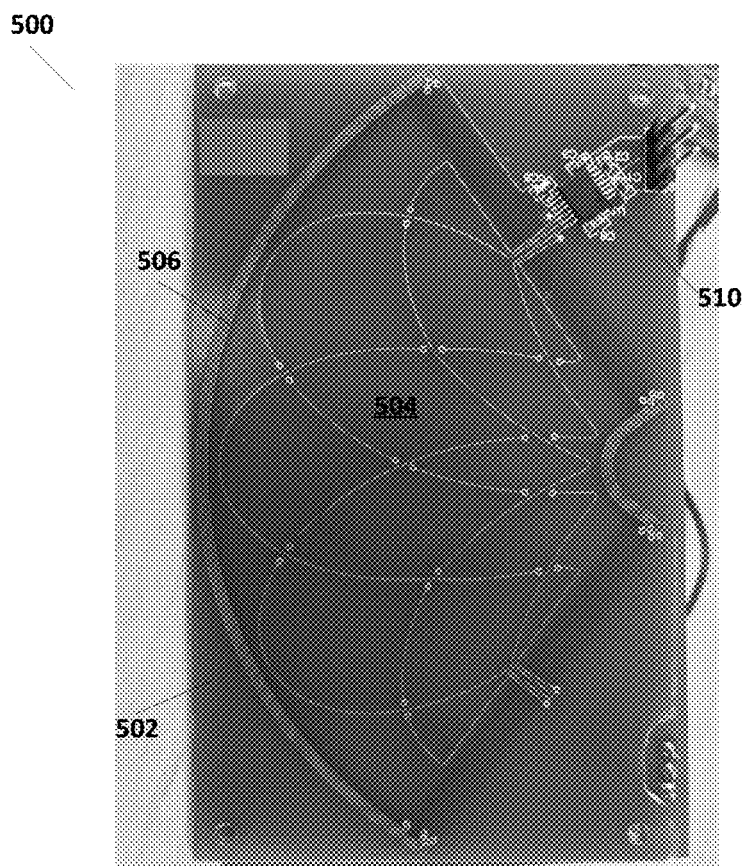
FIGS. 5A and 5B illustrate an arc positions sensor board that can be used in the position sensor illustrated in FIG. 2A.
Figure 5B:
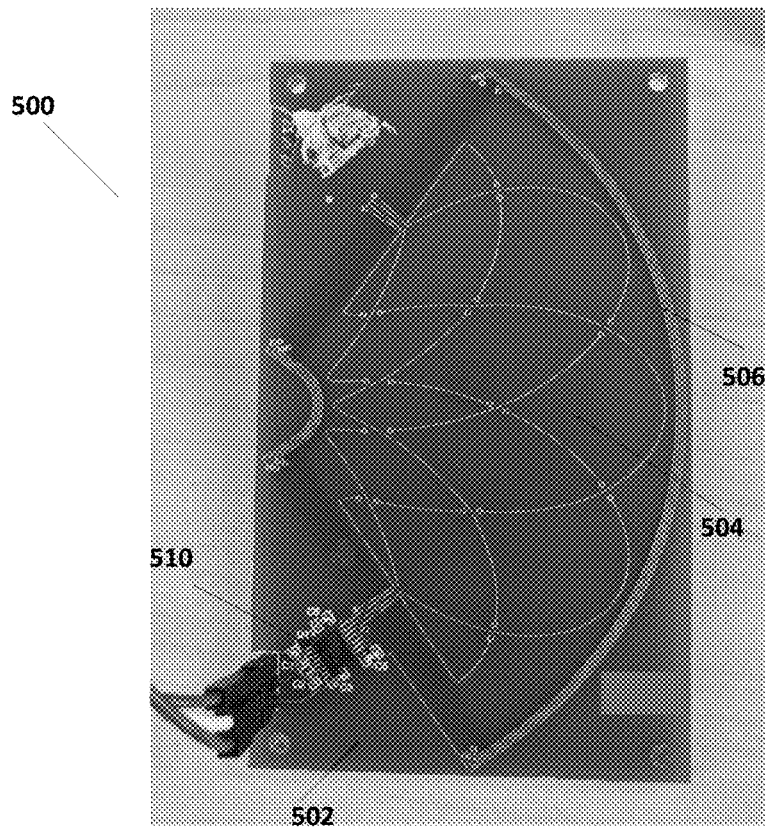

FIGS. 5A and 5B illustrate two identical stacked arc position sensor boards 500 that can be used as stacked boards 202. As illustrated, transmit coil 506 and sensor coils 504 are positioned in an arc. Circuit 510, which interfaces with stack controller 208, can be mounted along with coils 504 and 506 on printed circuit board 502. As discussed above, circuit 510 may be configured as a circuit 240 as illustrated in FIG. 2B.

In a typical design of embodiments of the present invention, sensor coils and transmit coil are designed on four (4) layer boards. Two symmetric coil designs can then be stacked and separated by the thickness of the printed circuit board (PCB) itself. The operating frequency range can be controlled to stay within particular specifications, for example as determined by the needs of a datasheet. The distance between the two-coil design on top and bottom influence a frequency increase. Consequently, the frequency can be controlled by the thickness of the PCB, or as illustrated in FIG. 2A by spacers between adjacent ones of boards 202. The magnitude of the measured signals can be controlled by adjusting the automatic integration cycle (ext) and the automatic gain control (GS) in the circuit 218, which is implemented between circuits on boards 202 and stack circuit 208.

Consequently, some embodiments of the present invention include two PCB sensors with the same geometry stacked as illustrated in FIG. 2A. In one of the two PCB sensors, the transmitter is shorted. In some embodiments, the distance Z between boards 202 is defined as the thickness of PCB boards 202.

Figure 6A:
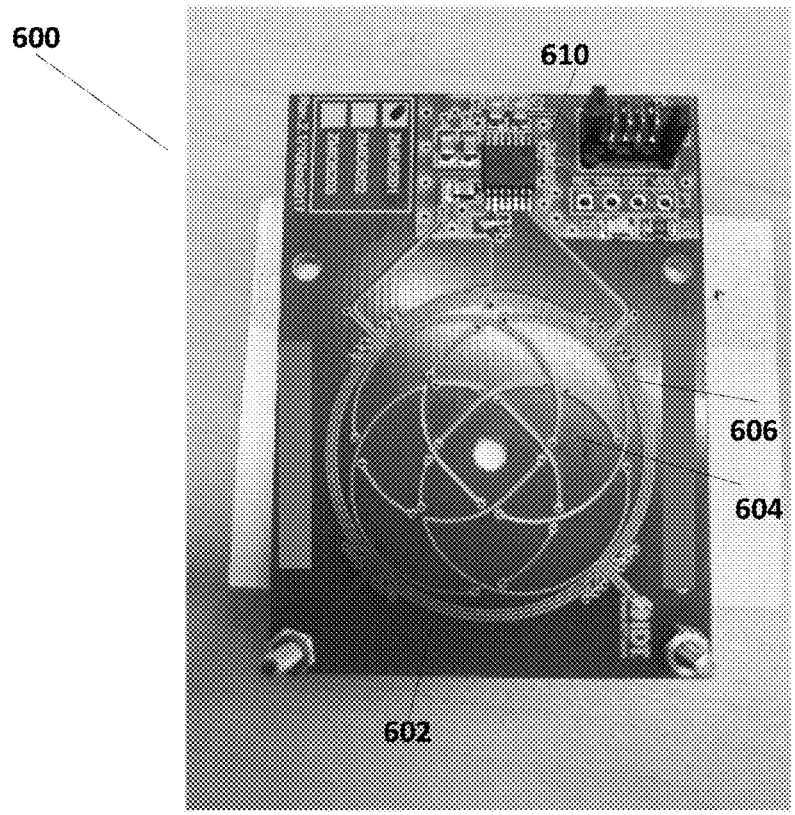
FIGS. 6A and 6B illustrate a stacked 360 degree rotary stacked position sensor according to some embodiments.
Figure 6B:
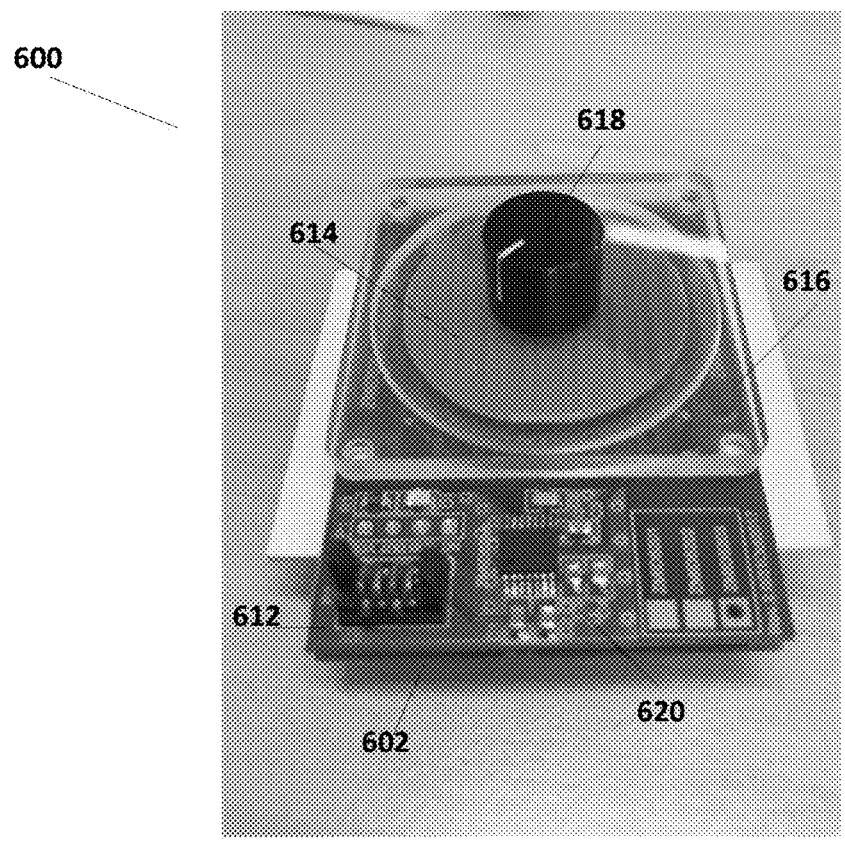

FIGS. 6A and 6B illustrate a stacked 360-degree position sensor 600 according to some embodiments of the present invention. FIG. 6A illustrates a bottom PCB board 602 on which transmit coil 606 and 360-degree sensor coils 604 are illustrated. In sensor 600, transmit coil 606 on board 602 is shorted to make it ineffective. Transmission coil 606 and sensor coils 604 are coupled to circuitry 610, which can be coupled to a stack controller circuit 208 as shown in FIGS. 2A and 2B. FIG. 6B illustrates the top PCB board 612. PCB board 612 includes sensor coils and transmission coils that are symmetrical with transmission coil 606 and sensor coils 604 illustrated in FIG. 6A. Further, as shown, circuitry 620 on board 612 can also be coupled to stack controller circuit 208 as illustrated in FIG. 2B. The transmission coil on PCB board 612 is active. As is further illustrated in FIG. 6B, an insulated spacer 616 separates the sensors on board 612 from a target 614, which is rotated with a knob 618. Using stacked position sensor 600 as illustrated in FIGS. 6A and 6B, test data was taken under various operating conditions and spacing Z between positions sensors on boards 602 and 612. The test data is further described below.

Figure 6C:
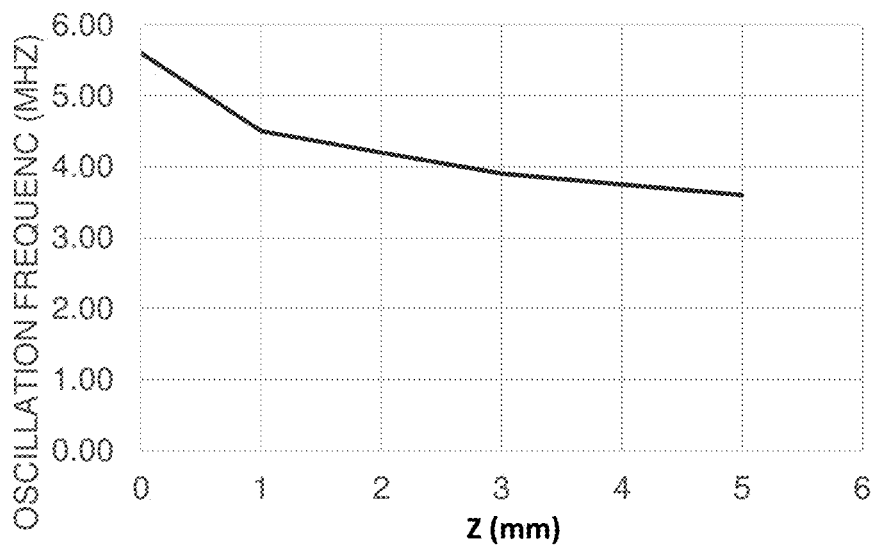
FIGS. 6C, 6D, 6E, and 6F illustrate some test data regarding the 360 degree rotary stacked position sensor as illustrated in FIGS. 6A and 6B.

FIG. 6C illustrates measurement of the oscillation frequency as a function of separation Z for position sensor 600 as illustrated in FIGS. 6A and 6B. As is illustrated in FIG. 4C, the following frequency data, measured with an oscilloscope during operation of the sensor, was obtained ("Inf" referring to the condition where board 602 is removed):

| Z (mm) | Frequency f (MHz) |
|---|---|
| 0 | 5.6 |
| 1 | 4.5 |
| 2 | 4.2 |
| 3 | 3.9 |
| 4 | 3.75 |
| Inf. | 3.6 |

Figure 6D:
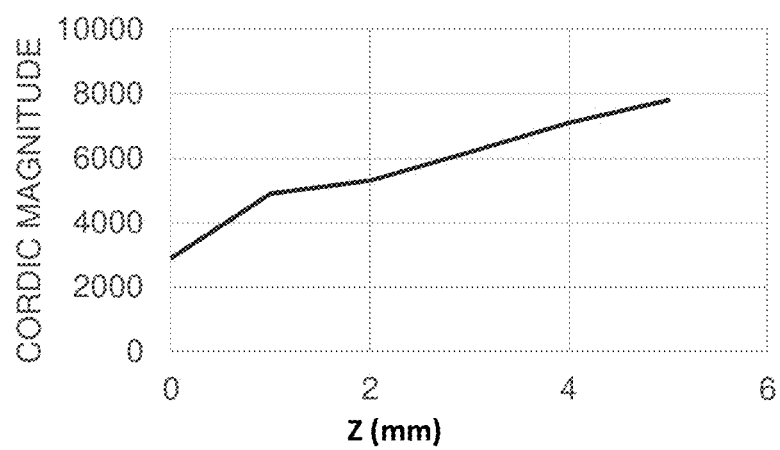

The CORDIC Magnitude can be read from a register of the circuit that includes the CORDIC 236 or from a processor that executes that function. In this example, CORDICs 236-1 and 236-2 are included in circuits 610 and 620, respectively. FIG. 6D illustrates the CORDIC magnitude as a function of Z for the embodiment illustrated in FIGS. 6A and 6B. The target 614 was fixed at a 1 mm distance (air gap) on top of the non-shorted transmit coil PCB 612. The actual position of target 614 on the rotary is not important as the magnitude is constant in the overall measurement range. With a gain stage (GS) of 8 and integration parameter EXT of 3, the following data was obtained:

| Z (mm) | Magnitude M |
|---|---|
| 0 | 2900 |
| 1 | 4900 |
| 2 | 5300 |
| 3 | 6180 |
| 4 | 7100 |
| Inf. | 7800 |

Figure 6E:
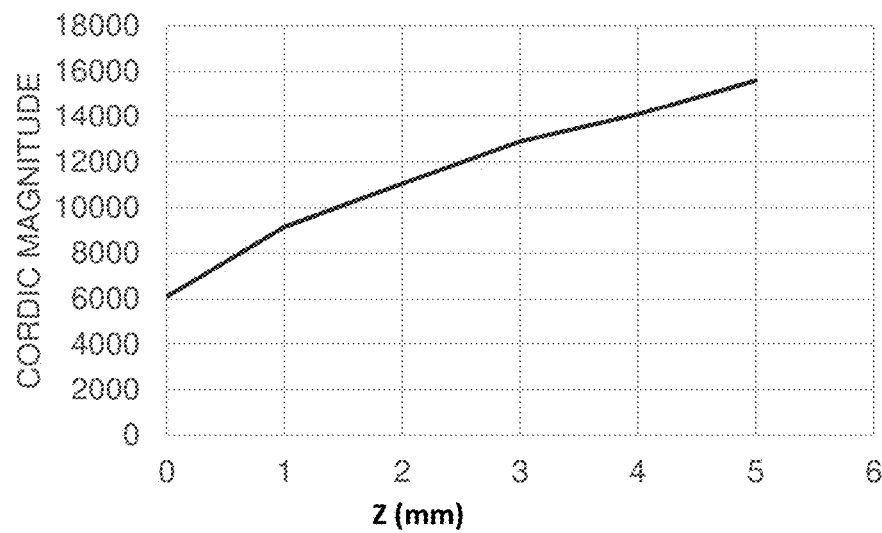

FIG. 6E illustrates the CORDIC magnitude as a function of Z for the embodiment illustrated in FIGS. 6A and 6B. The target 614 was fixed at a 1 mm distance (air gap) on top of the non-transmit coil shorted PCB 612. The actual position of the target on the rotary is not important as the magnitude is constant in the overall measurement range. With a gain stage (GS) of 8 and integration parameter EXT of 13, the following data was obtained:

| Z (mm) | Magnitude M |
|---|---|
| 0 | 6094 |
| 1 | 9154 |
| 2 | 11050 |
| 3 | 12900 |
| 4 | 14100 |
| Inf. | 15600 |

Figure 6F:
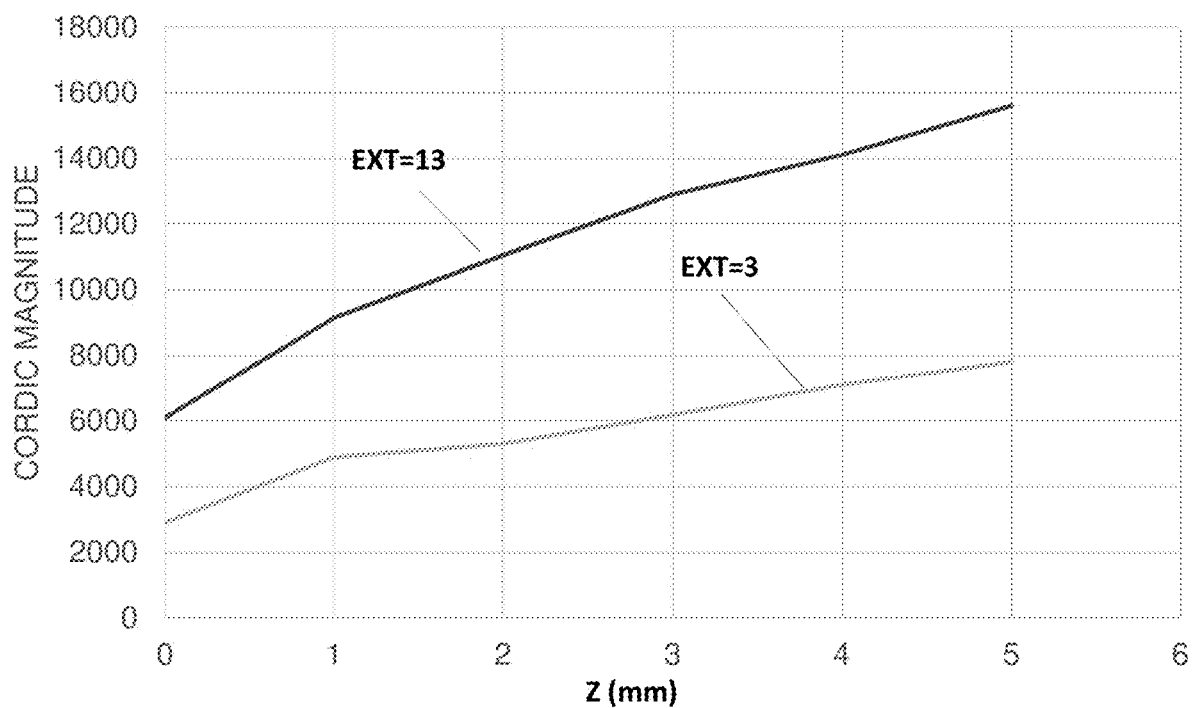

FIG. 6F compares the EXT=3 data of FIG. 6D and the EXT=13 data of FIG. 6E.

Figure 7A:
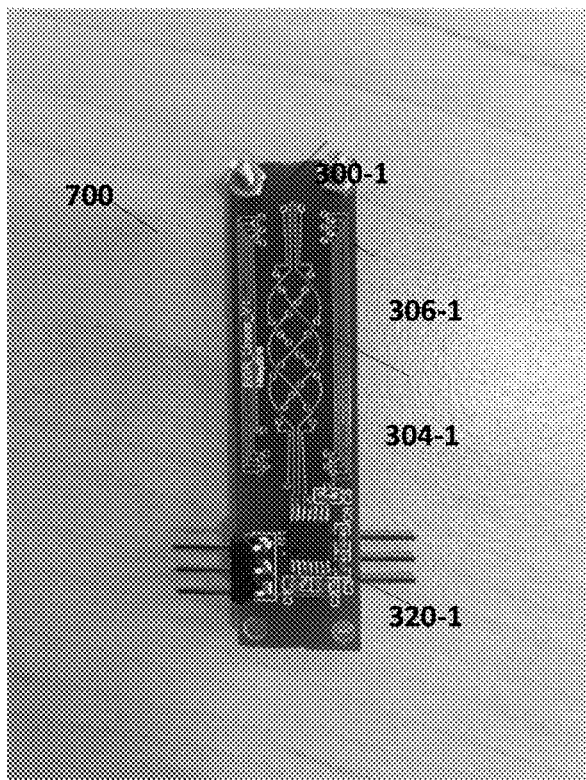
FIGS. 7A and 7B illustrate a stacked linear position sensor according to some embodiments using linear position boards similar to those illustrated in FIG. 3.
Figure 7B:
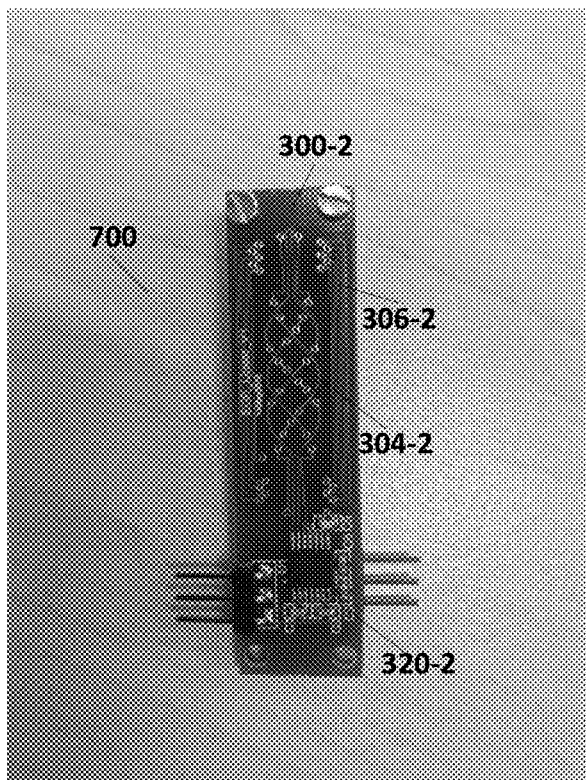

FIGS. 7A and 7B illustrate illustrates a linear redundant position sensor formed by stacking two PCBs such as that shown in FIG. 3 with identical linear position sensors. As shown in FIGS. 7A and 7B, boards 300-1 and 300-2 are stacked to form stacked linear position sensor 700. FIG. 7A illustrates board 300-1 with transmission coil 306-1, which is shorted, along with sensor coils 304-1 as described in FIG. 3. Circuit 320-1 is coupled to transmission coil 306-1, sensor coil 304-1, and provides signals to circuit 208 as illustrated in FIG. 2. FIG. 7B illustrates linear sensor board 300-2, with transmission coil 306-2 and sensor coils 304-2. Transmission coil 306-2 is an active (or not shorted) transmission coil. Circuit 320-2 is coupled to transmission coil 306-2 and sensor coils 304-2, drives transmission coil 306-2, and provides signals to circuit 208 as illustrated in FIG. 2.

Figure 7C:
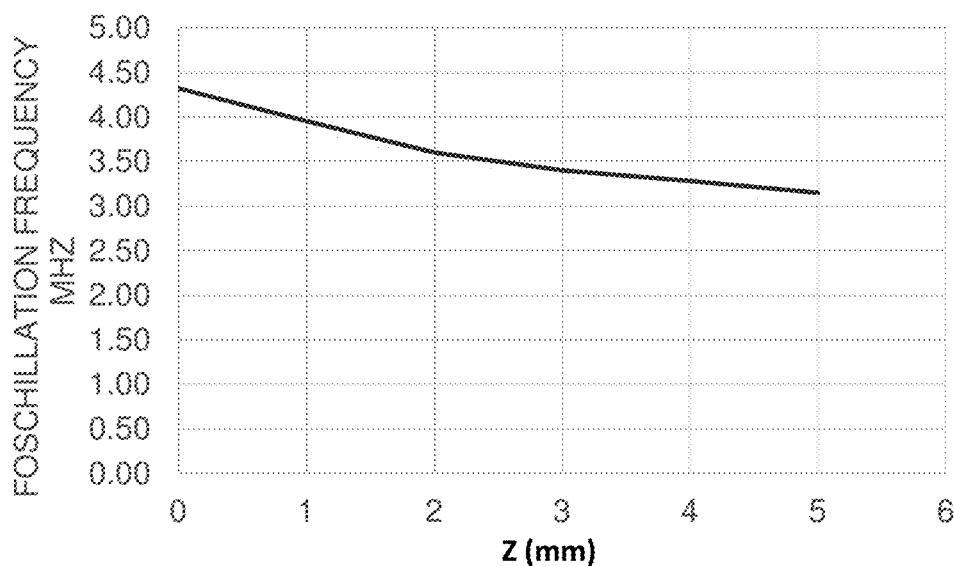
FIGS. 7C, 7D, 7E, and 7F illustrate data regarding the stacked linear position sensor according to some embodiments.

FIG. 7C illustrates a graph of frequency versus Z. The observed data is provided as follows:

| Z (mm) | Frequency f (MHz) |
|---|---|
| 0 | 4.7 |
| 1 | 3.95 |
| 2 | 3.6 |
| 3 | 3.4 |
| 4 | 3.28 |
| Inf. | 3.15 |

The following experimental data consists in measuring the CORDIC magnitude (e.g., reading the value from the register). The target is fixed with a 1 mm distance (air gap) on top of the board 300-2, which has the non-shorted transmit coil.

Figure 7D:
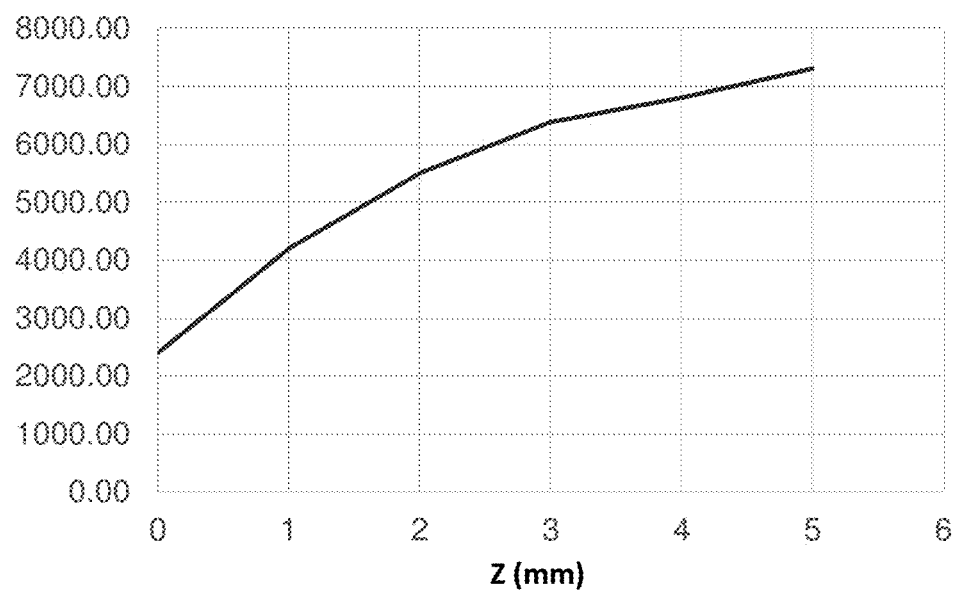

FIG. 7D illustrates the CORDIC Magnitude as a function of Z where the gain stage (GS) is 11 and the integration parameter EXT is 3. The data is provided as follows:

| Z (mm) | Magnitude M |
|---|---|
| 0 | 2400 |
| 1 | 4200 |
| 2 | 5500 |
| 3 | 6380 |
| 4 | 6800 |
| Inf. | 7300 |

Figure 7E:
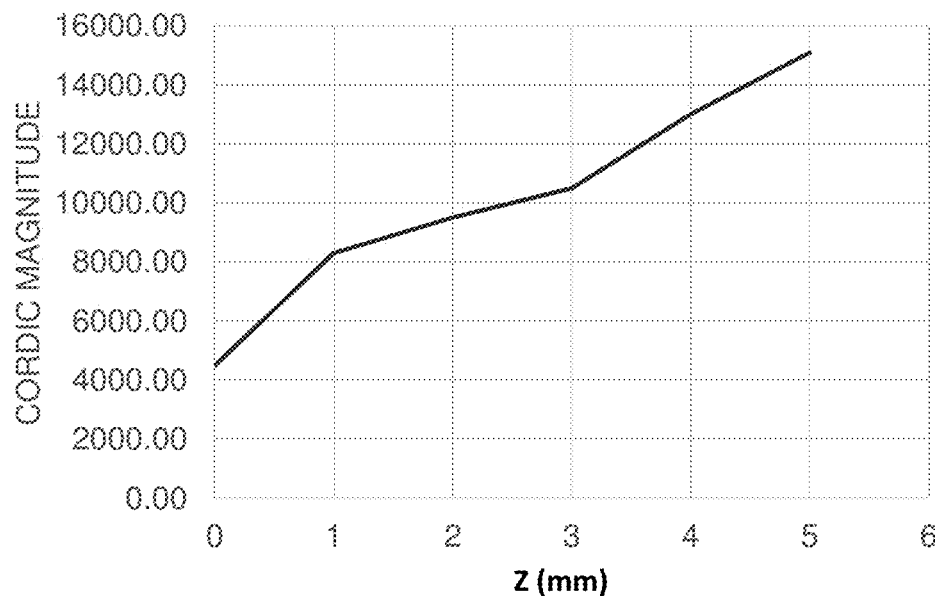

FIG. 7E illustrates CORDIC Magnitude data versus Z with the system illustrated in FIGS. 7A and 7B with a gain stage (GS) of 11 and integration parameter EXT of 13. The data is provided as follows:

| Z (mm) | Magnitude M |
|---|---|
| 0 | 4500 |
| 1 | 8300 |
| 2 | 9500 |
| 3 | 10500 |
| 4 | 13000 |
| Inf. | 15000 |

Figure 7F:
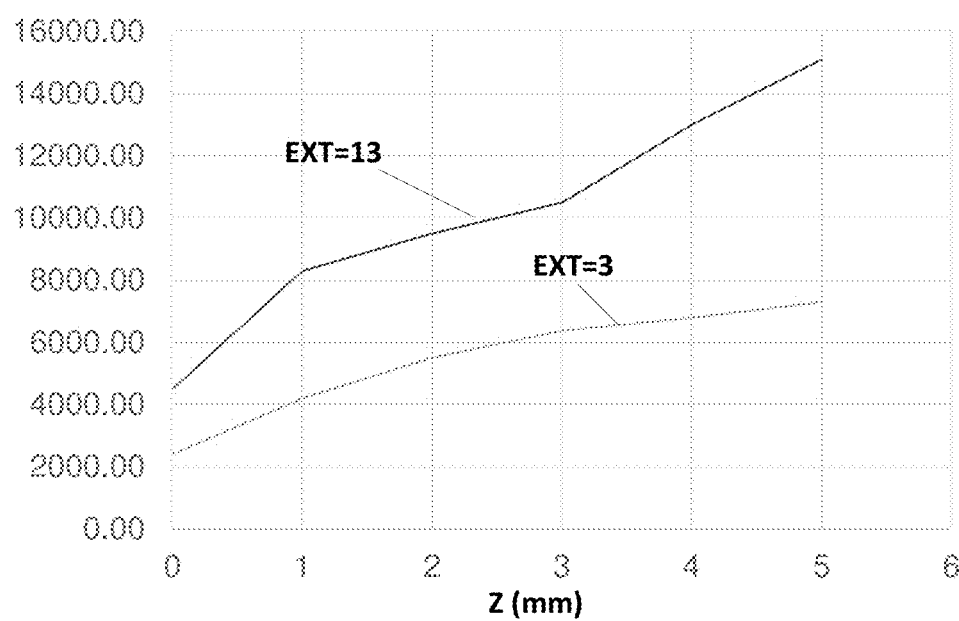

FIG. 7F illustrates a comparison of the data illustrated in FIGS. 7D and 7E.

Figure 8A:
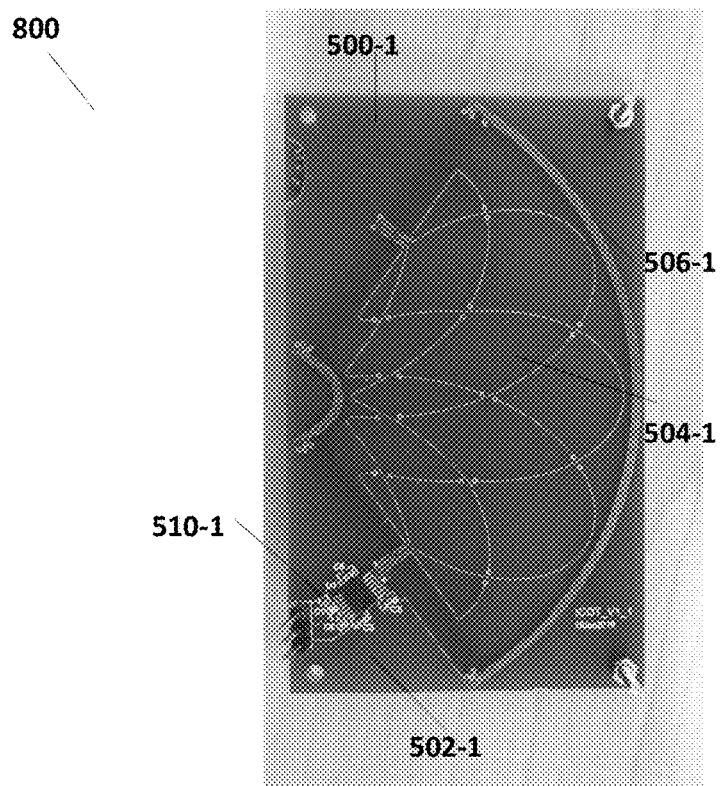
FIGS. 8A and 8B illustrated a stacked angular position sensor.
Figure 8B:
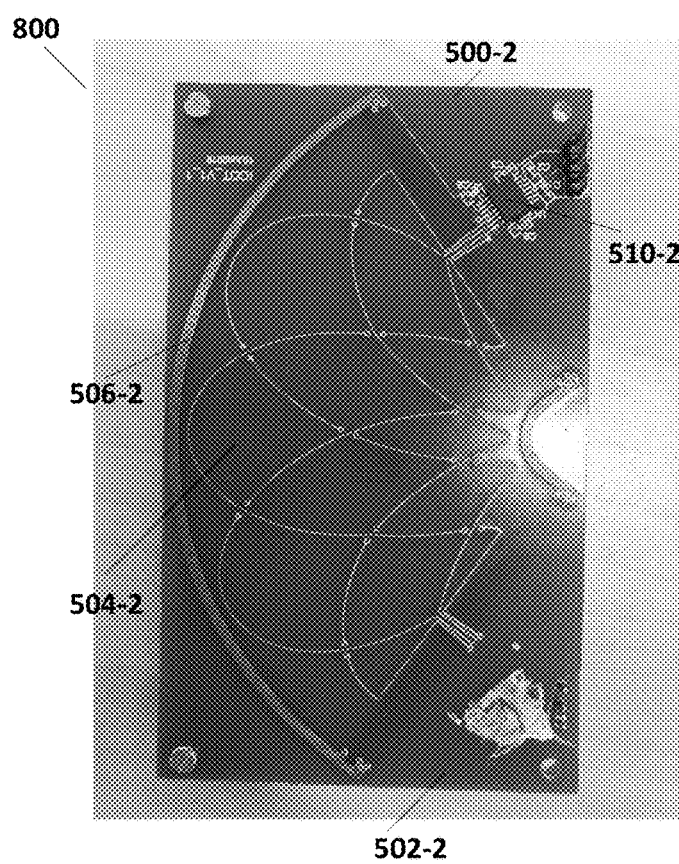

FIGS. 8A and 8B illustrates another example of a stacked position sensor system 800 based on the sensor boards 500 illustrated in FIGS. 5A and 5B. FIG. 8A illustrates position sensor board 500-1 transmission coil 506-1 and sensor coils 504-1 coupled to circuit 510-1. In this example, transmission coil 506-1 is shorted. FIG. 8B illustrates board 500-2 with transmission coil 506-2 and sensor coils 504-2 coupled to circuit 510-2. In this example, transmission coil 506-2 is active.

Figure 8C:
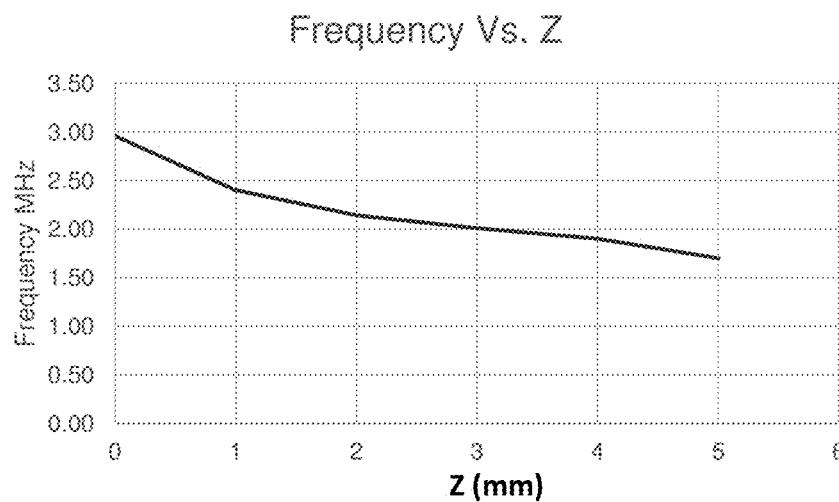
FIGS. 8C, 8D, 8E, and 8F illustrate data regarding the angular position sensor illustrated in FIGS. 8A and 8B.

FIG. 8C illustrates the frequency versus Z for the stacked position sensor system illustrated in FIGS. 8A and 8B. The frequency data is provided as follows:

| Z (mm) | Frequency f (MHz) |
|---|---|
| 0 | 2.96 |
| 1 | 2.4 |
| 2 | 2.140 |
| 3 | 2.01 |
| 4 | 1.9 |
| Inf. | 1.67 |

The following data consists in measuring the CORDIC magnitude (e.g., reading the value from the register). The target was fixed with a 2 mm distance (air gap) on top of the non-shorted transmission coil side of the position sensor.

Figure 8D:
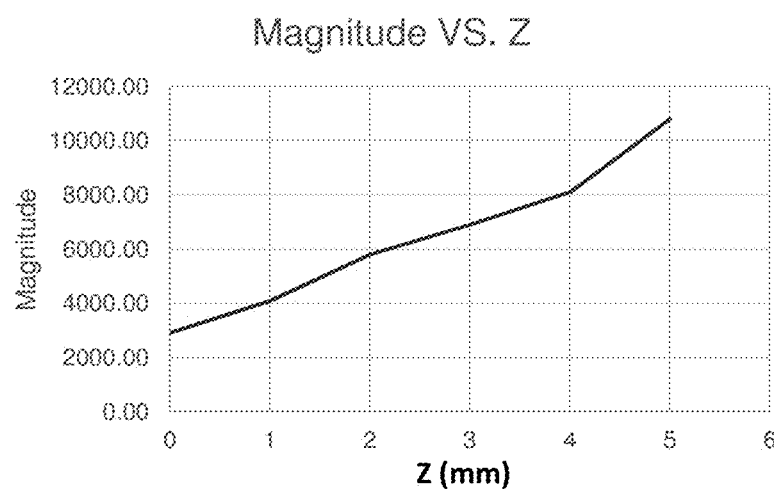

FIG. 8D illustrates the CORDIC magnitude as a function of Z for a system with gain stage (GS) of 5 and integration parameter EXT of 3. The data is provided below:

| Z (mm) | Magnitude M |
|---|---|
| 0 | 2900 |
| 1 | 4080 |

-continued

| Z (mm) | Magnitude M |
|---|---|
| 2 | 5800 |
| 3 | 6900 |
| 4 | 8100 |
| Inf. | 10800 |

Figure 8E:
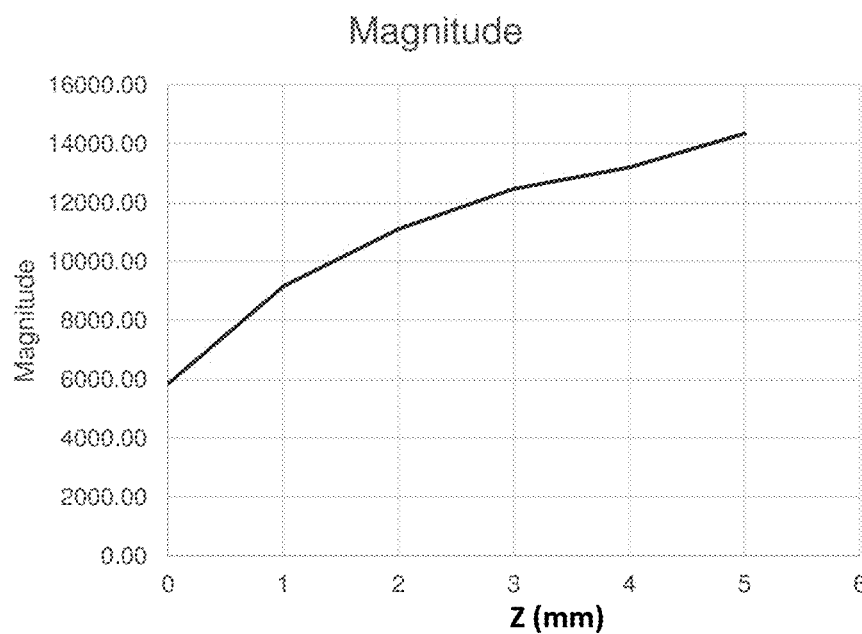

FIG. 8E illustrates the CORDIC magnitude as a function of Z for a system with gate stage (GS) of 5 and Integration parameter EXT of 13. The data is provided below:

| Z (mm) | Magnitude M |
|---|---|
| 0 | 5850 |
| 1 | 9160 |
| 2 | 11100 |
| 3 | 12470 |
| 4 | 13200 |
| Inf. | 14350 |

Figure 8F:
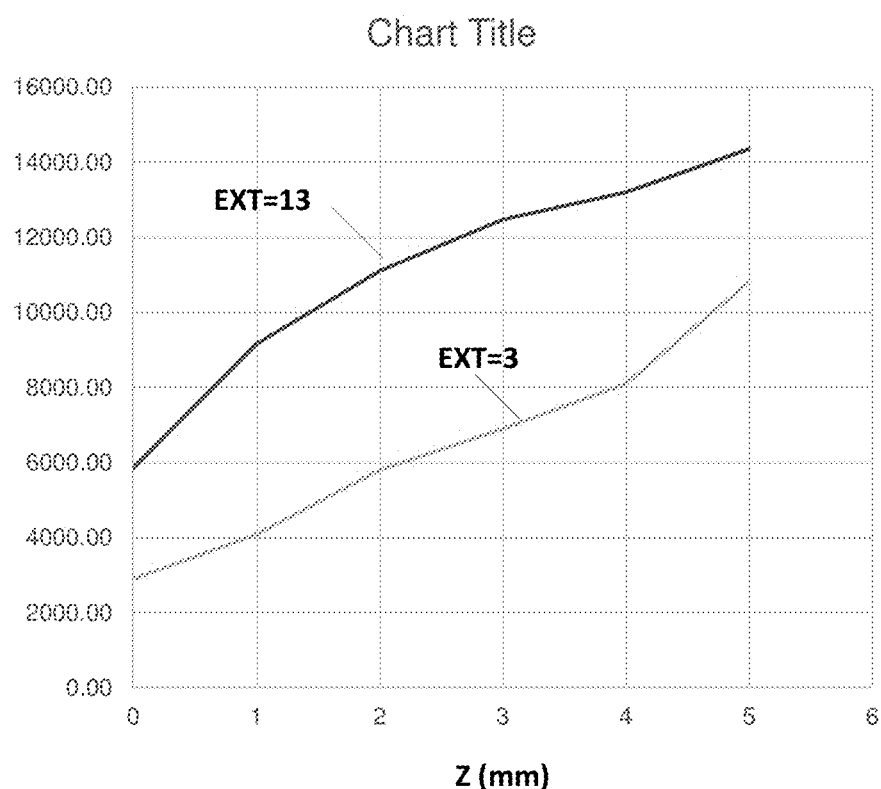

FIG. 8F illustrates a comparison of the data in FIGS. 6D and 6E.

With regard to the fixing the target in a redundant system such as that shown in FIGS. 8A and 8B. In some cases, the target is positioned on the top of the stacked PCBs. In some embodiments, the magnitude measured GS=5, Air gap=5 mm, and magnitude=5700. In another orientation, the target can be positioned on the bottom of the stacked PCBs with GS=5, air gap-=3 mm, and resulting magnitude of 10700. Options for the target positions includes using two targets. If the receivers are very close to each other, a single target can be used. In the above description, if only one target is used the gain stage automatic gain can be turned on.

FIGS. 9A, 9B, 9C, and 9D illustrate another embodiment of stacked position sensor 900 according to some embodiments of the present invention. Although FIGS. 9A, 9B, 9C, and 9D illustrate a 360-degree position sensor, the position sensor may be an angular position sensor or a linear sensor.

FIG. 9A illustrates one board 902-1. Board 902-1 includes transmit coil 906-1, receiver coils 904-1, and circuit 910-1 mounted on a four-layer printed circuit board 912-1. As is illustrated, transmitter coil 906-1 is provided on two layers while receive coils 904-1 are provided on the other two layers.

Similarly, FIG. 9B illustrates a second board 902-2. Board 902-2 includes transmit coil 906-2, receiver coils 904-2, and circuit 910-2 mounted on a four-layer printed circuit board 912-2. As illustrated, transmitter coil 906-2 is provided on two layers while receive coils 904-1 are provided on the other two layers.

As illustrated in FIGS. 9A and 9B, transmit coil 906-2 has a greater diameter than does transmit coil 906-1. Receive coils 904-1 and 904-2 are the same. In embodiments of the present invention, the relative diameters of transmit coils between coils may vary. The relative sizes of receive coils between stacked boards may also differ, but in most embodiments is the same.

Figure 9D:
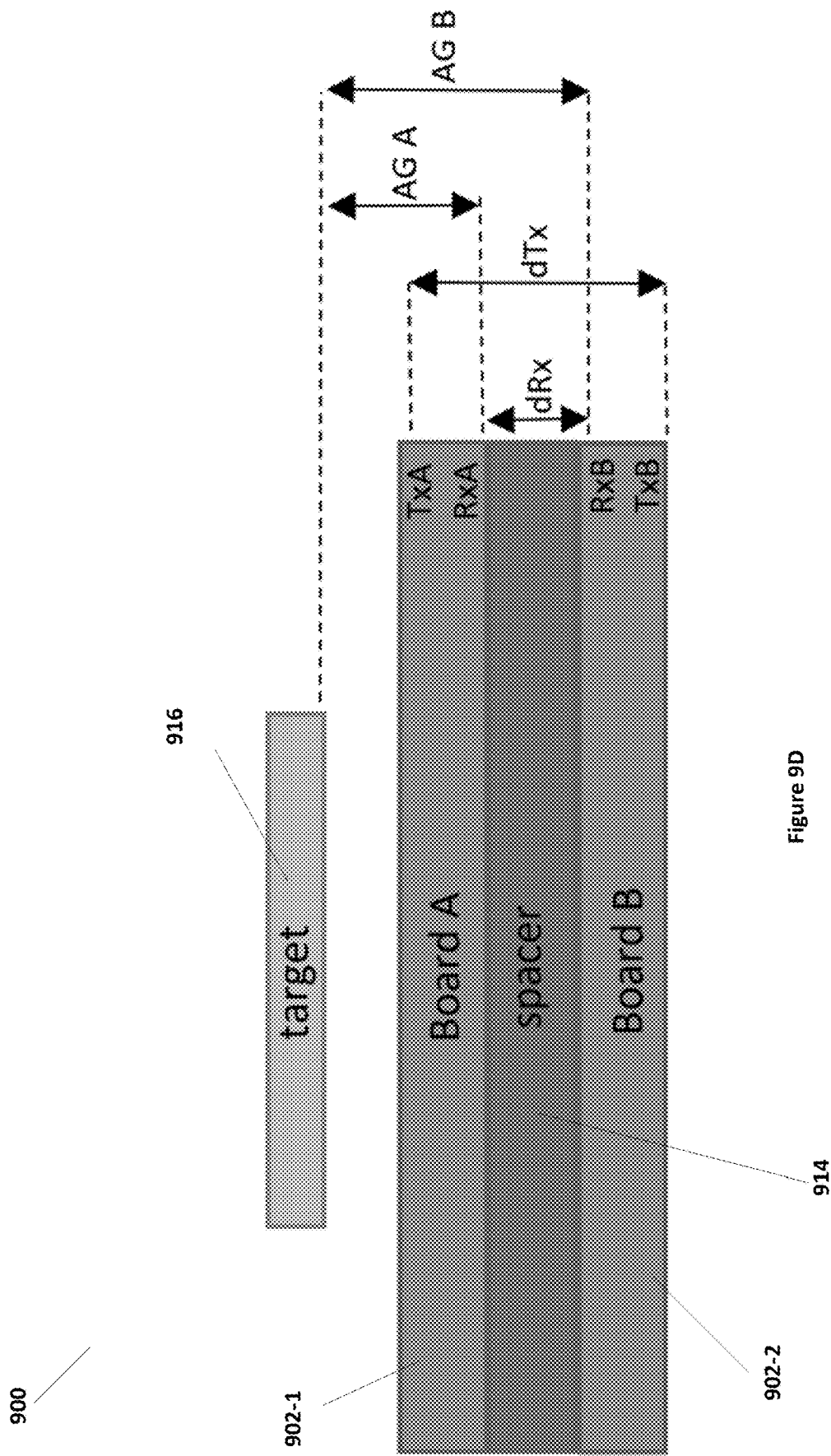

FIGS. 9C and 9D illustrates formation of stacked position sensor 900. As illustrated in FIG. 9C, board 902-1 and board 902-2 are oriented such that transmit coils 906-1 and 906-2 are on the outside of the resulting sensor 900 while receive coils 904-1 and 904-2 are closer together on the inside of sensor 900. Boards 902-1 and 902-2 are separated by a spacer 914, which can be another printed circuit board.

FIG. 9D further illustrates the separation distances. As illustrated in FIG. 9D, sensor boards 902-1 and 902-2 are separated by a spacer 914. Board 902-1 is positioned such that transmit coil 906-1 is on top and receive coils 904-1 are close to spacer 914. Similarly, board 902-2 is oriented such that receive coils 904-2 are close to spacer 914 and transmit coils 906-2 are on the bottom. Consequently, receive coils 904-1 and 904-2 are separated by a distance dRx. Transmit coils 906-1 and 906-2 are separated by a distance DTx.

A target 916 is illustrated positioned over sensor board 902-1. This results in an air gap between receiver coils 904-1 and target 916 of AG A and an air gap between receiver coils 904-2 and target 916 of AG B.

The larger the distance RX-TX on sensor 900, the higher is the magnitude when one of the transmitters is shorted. When shorted, a transmit coil 906 operates as a target for the sensors. With regard to sensor board 902-2, for example, the board thickness may be 1 mm, which results in a distance between receiver coil 904-1 and transmit coil 906-2 of 2 mm, where spacer 914 also has a thickness of 1 mm.

Consequently, in some embodiments of redundant systems according to the present invention, two position sensors are stacked and one of the transmit coils is shorted. The solution is based on the topological placement of the TX, RX, and target. Further illustrated in the configuration of FIG. 9D, transmit coil 906-1 would be active and transmit coil 906-2 is inactive.

The above detailed description is provided to illustrate specific embodiments of the present invention and is not intended to be limiting. Numerous variations and modifications within the scope of the present invention are possible. The present invention is set forth in the following claims.

What is claimed is:

1. A position sensor, comprising:
   a first position sensor board having first sensor coils and a first transmit coil;
   a second position sensor board having second sensor coils and second transmit coil stacked with, and separated from by a distance Z, the first position sensor; and
   at least one target positioned relative to the stacked first position sensor and second position sensor,
   wherein the second transmit coil is shorted while the first transmit coil is active.

2. The position sensor of claim 1, wherein the first sensor coils of the first position sensor board and the second sensor coils of the second position sensor board are symmetrical.

3. The position sensor of claim 2, wherein the first sensor coils includes a first sin-oriented coil and a first cos-oriented coil and the second sensor coils includes a second sin-oriented coil and a second cos-oriented coil.

4. The position sensor of claim 1, wherein the first position sensor board and the second position sensor board are each linear position boards.

5. The position sensor of claim 1, wherein the first position sensor board and the second position sensor board are each angular position boards.

6. The position sensor of claim 1, wherein the first position sensor board and the second position sensor board are each 360-degree position boards.

7. The position sensor of claim 1, wherein the first position sensor board includes a first controller circuit coupled to drive the first transmit coil and receive signals from the first sensor coils and wherein the second position sensor board includes a second controller circuit coupled to receive signals from the second sensor coils.

8. The position sensor of claim 7, further including a stack controller circuit coupled to the first controller circuit and the second controller circuit.

9. The position sensor of claim 8, wherein the first controller circuit comprises
- a first gain stage circuit that receives the signals from the first sensor coils, the first gain stage circuit providing a first amplified signal;
- an integration circuit that receives the first amplified signal and provides a first integrated signal;
- an analog-to-digital converter that receives the first integrated signal; and
- a CORDIC circuit that provides a first angle measurement from the first integrated signal.

10. The position sensor of claim 8, wherein the stack controller circuit receives a first angle measurement from the first controller circuit and a second angle measurement from the second controller circuit and is configured to determine a position of the target.

11. The position sensor of claim 1, wherein the target is positioned closest to the first position sensor board and the transmit coil of the first position sensor is active.

12. A redundant position sensor, comprising:
- a plurality of stacked sensor boards, each of the plurality of sensor boards including sensor coils, wherein at least one of the plurality of stacked sensor boards includes a transmit coil, and
- a target positioned over the plurality of stacked sensor boards,
- wherein one or more of the plurality of stacked sensor boards includes a transmission coil, wherein the transmission coil for each of the plurality of boards except for the one with the active transmit coil is shorted.

13. The redundant position sensor of claim 12, wherein the plurality of stacked sensor boards includes two stacked sensor boards.

14. The redundant position sensor of claim 12, wherein the plurality of sensor boards are linear position boards.

15. The redundant position sensor of claim 12, wherein the plurality of sensor boards are angular position boards.

* * * * *